US012675728B2

(12) United States Patent
Edwards et al.

(10) Patent No.:  US 12,675,728 B2
(45) Date of Patent:      Jul. 7, 2026

(54) SYSTEMS AND METHODS FOR IMPLEMENTING DATA TRANSFORMATIONS IN MULTIPLE EXECUTION CONTEXTS

(71) Applicant: Capital One Services, LLC, McLean, VA (US)

(72) Inventors: Michael Edwards, Arlington, VA (US); Lindsay Sturm, Seattle, WA (US); Christopher Larson, Denver, CO (US); Noriaki Tatsumi, Silver Spring, MD (US); Keira Zhou, Brooklyn, NY (US); Sinan Gul, New York, NY (US); Mesfin Mulugeta Dinku, Vienna, VA (US); Bhanu Gupta, Springfield, NJ (US); Christian Bartram, Orlando, FL (US); Connor Cason, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 915 days.

(21) Appl. No.: 17/181,085

(22) Filed: Feb. 22, 2021

(65) Prior Publication Data

US 2022/0269978 A1      Aug. 25, 2022

(51) Int. Cl.
*G06F 18/214*      (2023.01)
*G06F 16/25*       (2019.01)
*G06N 20/00*       (2019.01)

(52) U.S. Cl.
CPC ........... *G06N 20/00* (2019.01); *G06F 16/254* (2019.01)

(58) Field of Classification Search
CPC .............................. G06N 20/00; G06F 16/254
See application file for complete search history.

(56) References Cited

U.S. PATENT DOCUMENTS

| | | | | |
|---|---|---|---|---|
| 7,546,312 | B1 * | 6/2009 | Xu ........................ | G06F 16/254 |
| | | | | 707/999.102 |
| 9,031,992 | B1 | 5/2015 | Florissi et al. | |
| 9,436,507 | B2 * | 9/2016 | Mishra .................. | G06F 9/4881 |
| 10,055,426 | B2 | 8/2018 | Arasan et al. | |
| 10,261,763 | B2 | 4/2019 | Fink et al. | |
| 10,521,404 | B2 | 12/2019 | Arasan et al. | |
| 11,176,175 | B1 * | 11/2021 | Snyder .................. | G06F 16/254 |

(Continued)

FOREIGN PATENT DOCUMENTS

WO      WO-2012051389 A1 *    4/2012    .............. G06F 8/70

OTHER PUBLICATIONS

Johari, Aayushi, "Python Decorator: Learn How to Use Decorators in Python" (Sep. 23, 2019) (Year: 2019).*

(Continued)

*Primary Examiner* — Shahid K Khan
(74) *Attorney, Agent, or Firm* — TROUTMAN PEPPER LOCKE LLP; Christopher J. Forstner; John A. Morrissett

(57) ABSTRACT

A data transformation system for implementing reproducible and consistent data transformations in multiple execution contexts (batch, streaming, etc.) where the transformation function/logic initially acts on historical raw data to produce derived data to train a machine learning model. When the model is trained and deployed to handle streaming event data, the same transformation is reused to transform streaming data into the appropriate derived data for the model scoring, and later for a refit of the model.

20 Claims, 7 Drawing Sheets

(56) References Cited

U.S. PATENT DOCUMENTS

| | | | |
|---|---|---|---|
| 2004/0249644 A1* | 12/2004 | Schiefer | G06Q 10/06375 |
| | | | 705/7.37 |
| 2005/0278152 A1* | 12/2005 | Blaszczak | G06F 16/254 |
| | | | 703/1 |
| 2011/0167035 A1* | 7/2011 | Kesel | G06F 16/283 |
| | | | 707/602 |
| 2013/0226944 A1 | 8/2013 | Baid et al. | |
| 2014/0040182 A1* | 2/2014 | Gilder | G06F 16/256 |
| | | | 707/602 |
| 2014/0358826 A1* | 12/2014 | Traupman | G06N 5/02 |
| | | | 706/46 |
| 2015/0134589 A1* | 5/2015 | Marrelli | G06F 16/254 |
| | | | 707/602 |
| 2015/0379429 A1* | 12/2015 | Lee | G09B 5/00 |
| | | | 706/11 |
| 2017/0193371 A1* | 7/2017 | Shen | G06F 16/24568 |
| 2018/0060364 A1* | 3/2018 | Zengerle | G06F 16/211 |
| 2018/0315330 A1* | 11/2018 | Mitros | H04L 43/0811 |
| 2019/0318282 A1 | 10/2019 | Patel et al. | |
| 2020/0356363 A1* | 11/2020 | Dewitt | G06F 8/75 |

OTHER PUBLICATIONS

O'Sullivan, Pat & Thompson, Gary & Clifford, A.. (2014). Applying data models to big data architectures. IBM Journal of Research and Development. 58. 18:1-18:11. 10.1147/JRD.2014.2352474.

\* cited by examiner

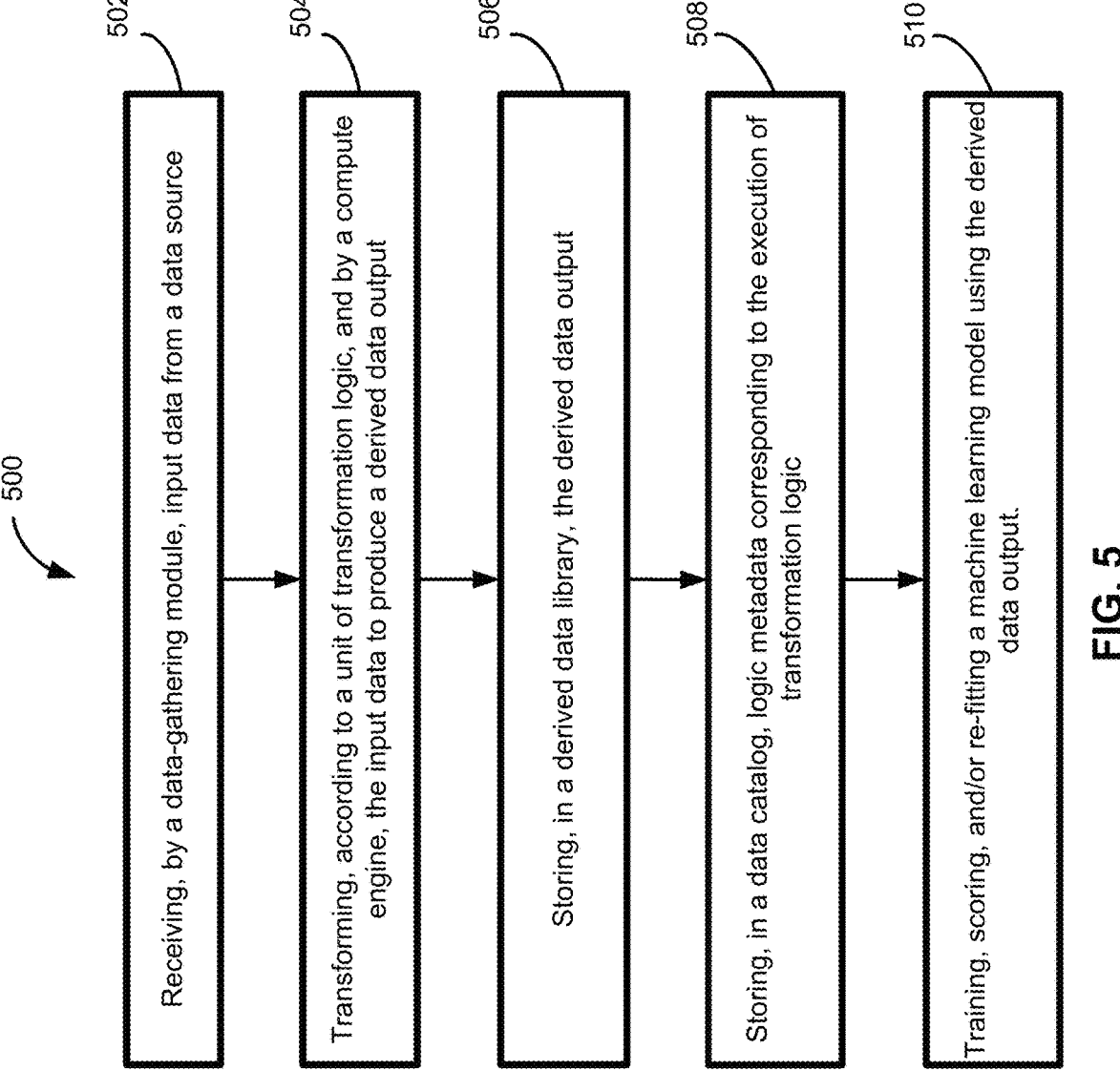

500

502 — Receiving, by a data-gathering module, input data from a data source

504 — Transforming, according to a unit of transformation logic, and by a compute engine, the input data to produce a derived data output 506 — Storing, in a derived data library, the derived data output 508 — Storing, in a data catalog, logic metadata corresponding to the execution of transformation logic 510 — Training, scoring, and/or re-fitting a machine learning model using the derived data output.

FIG. 5

SYSTEMS AND METHODS FOR IMPLEMENTING DATA TRANSFORMATIONS IN MULTIPLE EXECUTION CONTEXTS

FIELD

This disclosure relates to systems and methods for creating reusable data transformation logic in machine learning applications that rely on derived data. In certain implementations, the transformation logic may be utilized for multiple execution contexts such as batch, API, and/or streaming from a single shared implementation.

BACKGROUND

Data scientists are often tasked with building and training machine learning models to utilize and/or analyze input data for various objectives and functions. Even after being deployed, machine learning models often require resources and manpower to regularly update and/or replace the models as business conditions change. An organization may utilize a data warehouse as a central repository, for example, to integrate data from disparate sources so that it can be leveraged to automate processes, support company policies, provide business intelligence, etc. However, each specialized operational function typically involves different people, different systems, different programming languages, and different requirements for the way the data is processed and used, which can lead to inconsistency, wasted effort, and can create many governance challenges, particularly when the information to be processed is not organized in a way that makes it readily accessible, requires queries that are too complicated, and/or that requires intensive resources. Furthermore, data scientists, engineers, and/or business analysts are less likely to use such data if they do not have visibility and confidence in the underlying logic.

Inputs to machine learning models are typically called "features." Features can be raw data values, such as the number of times a user has clicked on a web page, a customer's date of birth, etc. Features may also be derived values, such as a customer's current account balance, a 30 day average of transaction amounts, etc. To utilize such data, machine learning engineers typically gather the raw and/or derived data using scripts (such as SQL) to retrieve the data out of a database so that further calculations may be performed. However, this approach can lead to several problems. First, the raw and/or derived data values are typically pulled and calculated using a single script, which can make it difficult to reuse just a feature to feed a different machine learning model. Rather, the script code is often just copied and pasted, which can lead to redundancy and inconsistency. Second, if the data derivation logic is tied to the data retrieval logic, and if the data is moved from one kind of database to another (e.g. Oracle to Microsoft), the combined calculation logic/retrieval code must be rewritten. This can lead to inefficiencies and unintended coding errors because the retrieval script must be changed, while the underlying calculation may not need to be changed. Third, for big data retrieval and calculation jobs, the data scientists often use special software (such as Spark) so that the retrieval and calculations jobs can run efficiently. However, such technologies also change with time, and if the data derivation logic is also tied to a particular technology or software, the calculations will need to be rewritten every time the technology or software changes. This can create unnecessary complications and extra work, particularly when the logic for calculating a particular value does not change.

Accordingly, there is a need for improved systems and methods that can provide a sustainable, systematic, discoverable, and reusable logic to process data transformations in multiple contexts. Embodiments of the present disclosure are directed to this and other considerations.

BRIEF SUMMARY

Disclosed embodiments provide systems and methods for providing reusable data transformation logic in machine learning applications that rely on derived data.

Consistent with the disclosed embodiments, the system may include one or more processors in communication with a data-gathering module, a compute engine configured to execute transformation logic, a data catalog configured to store logic metadata, a derived data library, and memory storing instructions that, when executed by the one or more processors, are configured to cause the system to receive, by the data gathering module, input data from a data source, transform, according to the transformation logic and by the compute engine, the input data to produce a derived data output. The system may store, in the derived data library, the derived data output, store, in the data catalog, logic metadata corresponding to the transformation logic, and train, score, and/or re-fit a machine learning model using the derived data output.

Consistent with the disclosed embodiments, a method is provided that includes receiving, by a data-gathering module, input data from a data source, transforming the input data by a compute engine according to a unit of transformation logic to produce a derived data output, storing, in a derived data library, the derived data output, storing, in a data catalog, logic metadata corresponding to the transformation logic, and training, scoring, and/or re-fitting a machine learning model using the derived data output.

Consistent with the disclosed embodiments, non-transitory computer-readable storage media is disclosed for storing instructions that are configured to cause one or more processors to perform a method of receiving, by a data-gathering module, input data from a data source, transforming the input data by a compute engine according to a unit of transformation logic to produce a derived data output, storing, in a derived data library, the derived data output, storing, in a data catalog, logic metadata corresponding to the transformation logic, and training, scoring, and/or re-fitting a machine learning model using the derived data output.

Further features of the disclosed design and the advantages offered thereby are explained in greater detail hereinafter regarding specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which illustrate various implementations and aspects of the disclosed technology and, together with the description, serve to explain the principles of the disclosed technology.

FIG. 5 is a flow diagram of a method 500, according to an exemplary implementation of the disclosed technology.

DETAILED DESCRIPTION

Figure 1:
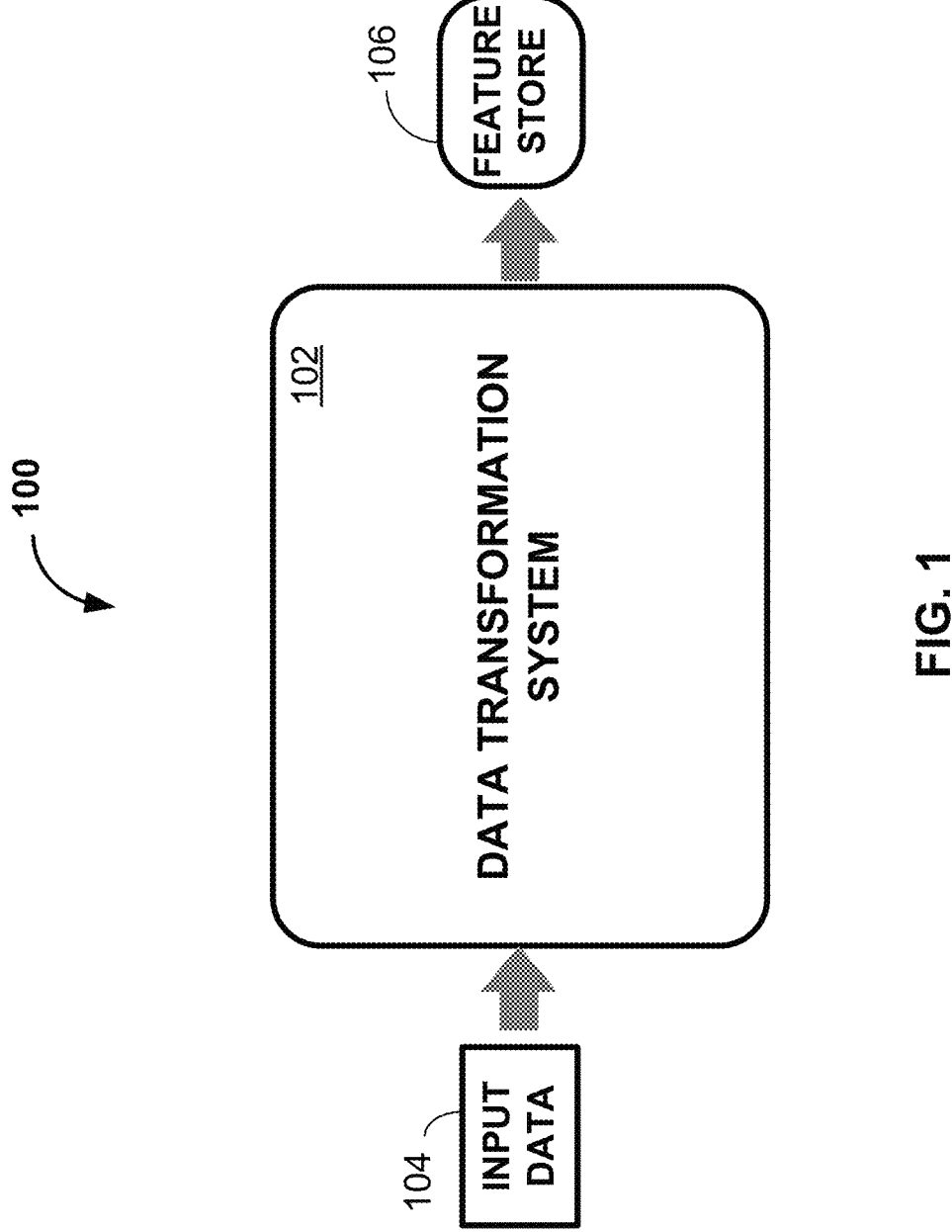
FIG. 1 is a block diagram illustration 100 of a data transformation system for pre-processing input data for calculating and storing features.

The disclosed technology is generally related to machine learning operations (MLOps), which is a practice involving integration between data engineering, DevOps (IT), and Machine Learning (ML) for training and deploying Artificial Intelligence (AI) models. Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

The disclosed technology may be utilized to overcome certain challenges associated with transformation logic that has traditionally been coupled to a particular model, data retrieval process, and/or technology. Implementations of the disclosed technology may utilize a library of decoupled transformation logic as standalone units, which can be decoupled from other associated processes, scripts, and/or technology. In certain exemplary implementations, the decoupled transformation logic units may be written such that they do not need to also handle the burden of retrieving data from a database. Rather, the transformation logic may reference data it needs (for example, via metadata) and a separate data gathering module may be utilized to retrieve the appropriate data. In this respect, the data gathering module may deal with changes in underlying storage/model/retrieval/technology rather than requiring every transformation unit in the library to deal with it. In certain exemplary implementations, the logic transformations may be written as pure functions, and a separate compute engine may be utilized to handle working with any of the underlying computing technology.

In certain exemplary implementations of the disclosed technology, the decoupling concepts disclosed herein enable the libraries of transformations to work in a variety of contexts, including but not limited to batch jobs, web API processes, and/or streaming contexts. Furthermore, the libraries of transformations may be utilized to train a machine language model and reuse data and/or logic in running those models once trained. Thus, certain implementations of the disclosed technology may be considered to enable the technical effect and benefit of "write once/run anywhere"—processes.

Consistent with implementations of the disclosed technology, the term "feature" as discussed herein may be defined as "instructions on how to transform input data into new output data." In certain implementations, a feature can be considered a unit of transformation logic. In some implementations, a feature may also include capabilities, inputs to models, and/or values that are produced. As will be further discussed below, metadata may be co-located with the feature to provide context for the use of the feature. The metadata, for example, can provide contextual information regarding dependencies, lineage, quality, and/or discovery. In certain implementations, the co-located metadata may enable nesting of the features, which can reduce duplication and inconsistency. Thus, according to certain exemplary implementations of the disclosed technology, features can include coded business logic to perform specific data transformations and the co-located metadata may provide a "self-awareness" to the feature.

Certain implementations of the disclosed technology address the concepts that (1) data is needed for machine learning; (2) reuse of the data (particularly derived data) may require trust; and (3) trust may require transparency. In certain exemplary implementations, data reuse may be maximized by implementing an intent once and deploying it across contexts (from batch to real-time). Furthermore, data reuse may be enhanced by addressing reuse of data across the data lifecycle (for example, from ETL, to machine learning, to analysis) and across associated roles (from Data Scientists, to Data Analysts, to Business Analysts). Such challenges may be addressed by implementations of the disclosed technology, which may utilize a feature platform where business logic is decoupled from the data gathering logic and distributed compute technology. Decoupling the logic from the underlying data enables chaining features together, providing a computationally enforced and fully transparent lineage. By placing the burden of data gathering on the feature engine, the same feature logic can run in a variety of contexts: from batch to streaming to real-time, i.e. "write once/run anywhere." In certain implementations, the decoupling may keep the logic simpler and easier to author, which may open feature authoring to more people, and may help reduce technical resource requirements. Furthermore, decoupling the business logic from the underlying technology enables the technology to change, leaving the business logic unaffected, thus extending the lifecycle of the business logic.

FIG. 1 is a simplified block diagram illustration 100 of an example data transformation system 102 that may be utilized for pre-computing input data 104 from various sources. In certain implementations, pre-computed features may be stored in a feature store 106 for later use, which can provide certain performance benefits and/or enhanced efficiency. As will be discussed further below, certain implementations of the disclosed technology may enable the deployment of production-ready machine learning applications that can leverage the input data 104 using scalable, compliant, and reproducible processes. Certain exemplary implementations may utilize transformation logic units to produce derived data in multiple execution contexts, across various applications and machine learning models. Certain implementations may preserve data transformation parity across multiple types of consumers.

Among the challenges addressed with the disclosed technology is the complexity and difficulty with co-locating the data gathering process with the use of a feature. Thus, certain implementations of the disclosed technology may decouple data-gathering operations from the business logic by specifying that the features as pure functions configured to accept and operate on the input data. Certain implementations may utilize a map to connect the features to physical data sources. Implementations of the disclosed technology may provide the tangible technical benefits of simplifying feature definitions, improving feature testing, preventing unintended changes, and re-use of feature code and/or associated transformation logic code.

As disclosed herein, the decoupling of the feature definition and the feature execution from the data-gathering process may enable the re-use of the feature code. Furthermore, co-locating metadata with the feature may provide the dual benefit of having the feature both human and machine-readable. In certain implementations, the metadata may be programmable. For example, as will be discussed below in FIG. 7, the metadata 704 includes two inputs 706, 708 for a transformation 702 and referred to as "entity_a_attribute_1" and "entity_a_attribute_2". These metadata may be considered programmable in the sense that they can be used to drive a data gatherer module (such as the data gatherer 310, discussed below with respect to FIG. 3) to retrieve the data needed by the transformation 702. Because the metadata are meant for consumption by computers, i.e. automated processes, in addition to consumption by human beings, they are more likely to be kept current when programmable, since their accuracy may be critical to the proper functioning of the specified feature or transformation. This is just one example of the way in which programmable metadata may be used by the data transformation system 102.

Figure 2:
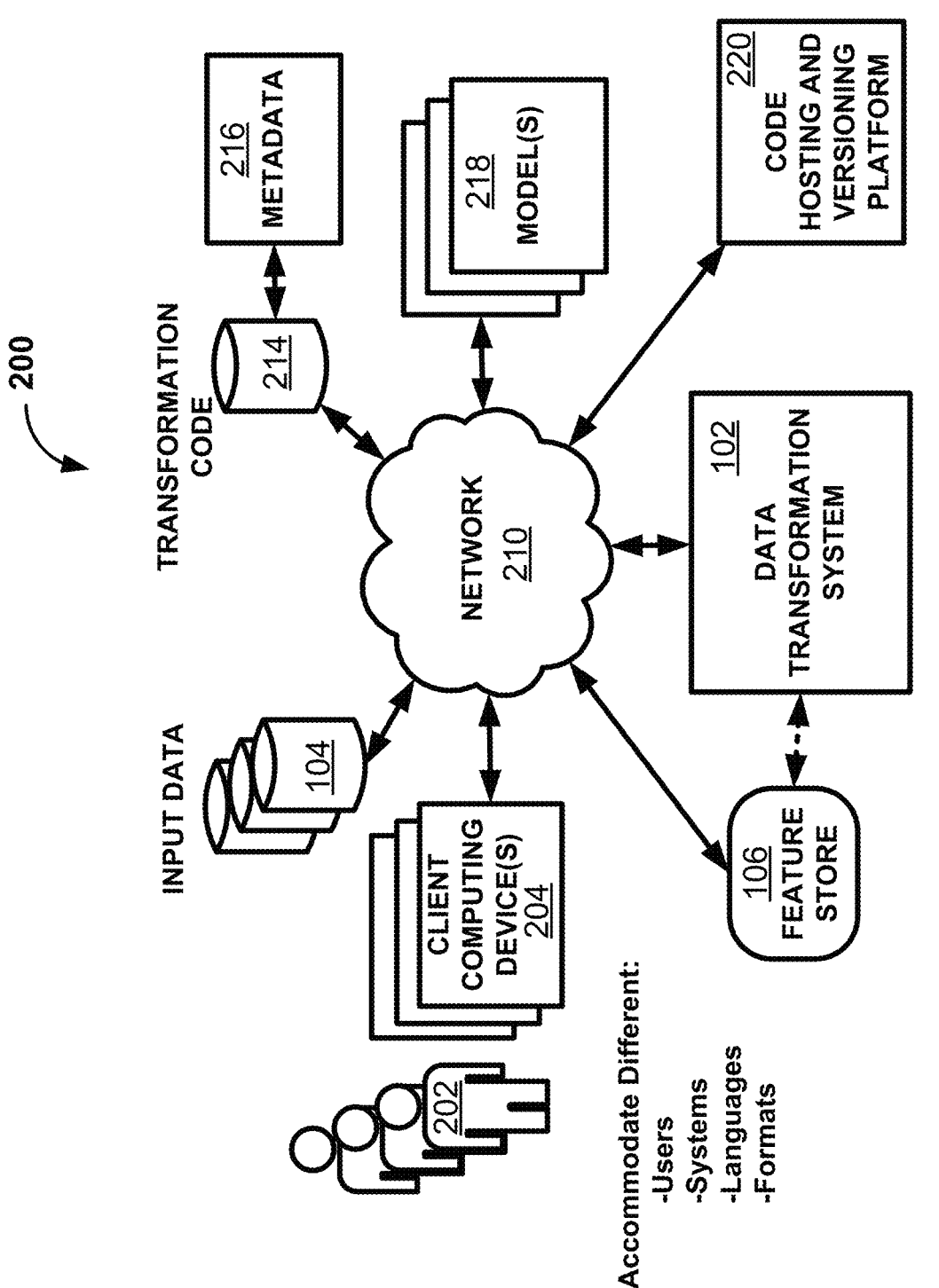
FIG. 2 illustrates an environment 200 and associated systems for implementing data transformations in multiple execution contexts, according to an exemplary embodiment of the disclosed technology.

FIG. 2 illustrates an example environment 200 in which a data transformation system 102 may be utilized to transform data in multiple execution contexts, according to an exemplary embodiment of the disclosed technology. As will be further discussed below with reference to FIG. 3, the disclosed technology may be utilized to transform input data 104, accommodate different users 202, different computing devices 204, different languages, and/or different formats. In certain exemplary implementations, a network 210 such as a local area network and/or a wide area network may be utilized to communicate among the associated modules and systems.

In certain exemplary implementations of the disclosed technology, the data transformation system 102 may include or work in conjunction with a feature store 106, for example, to retrieve pre-computed features and/or transform input data 104 so that such features or transformed data can be used to train one or more models 218. In certain exemplary implementations, and as discussed above, the transformation code 214 may include features that can be tagged or stored in the feature store 106 and/or a feature library with metadata 216 to enable discovery and reuse. In certain exemplary implementations, the transformation code 214 may be stored on a code hosting and versioning platform 220 such as GitHub.

Figure 3:
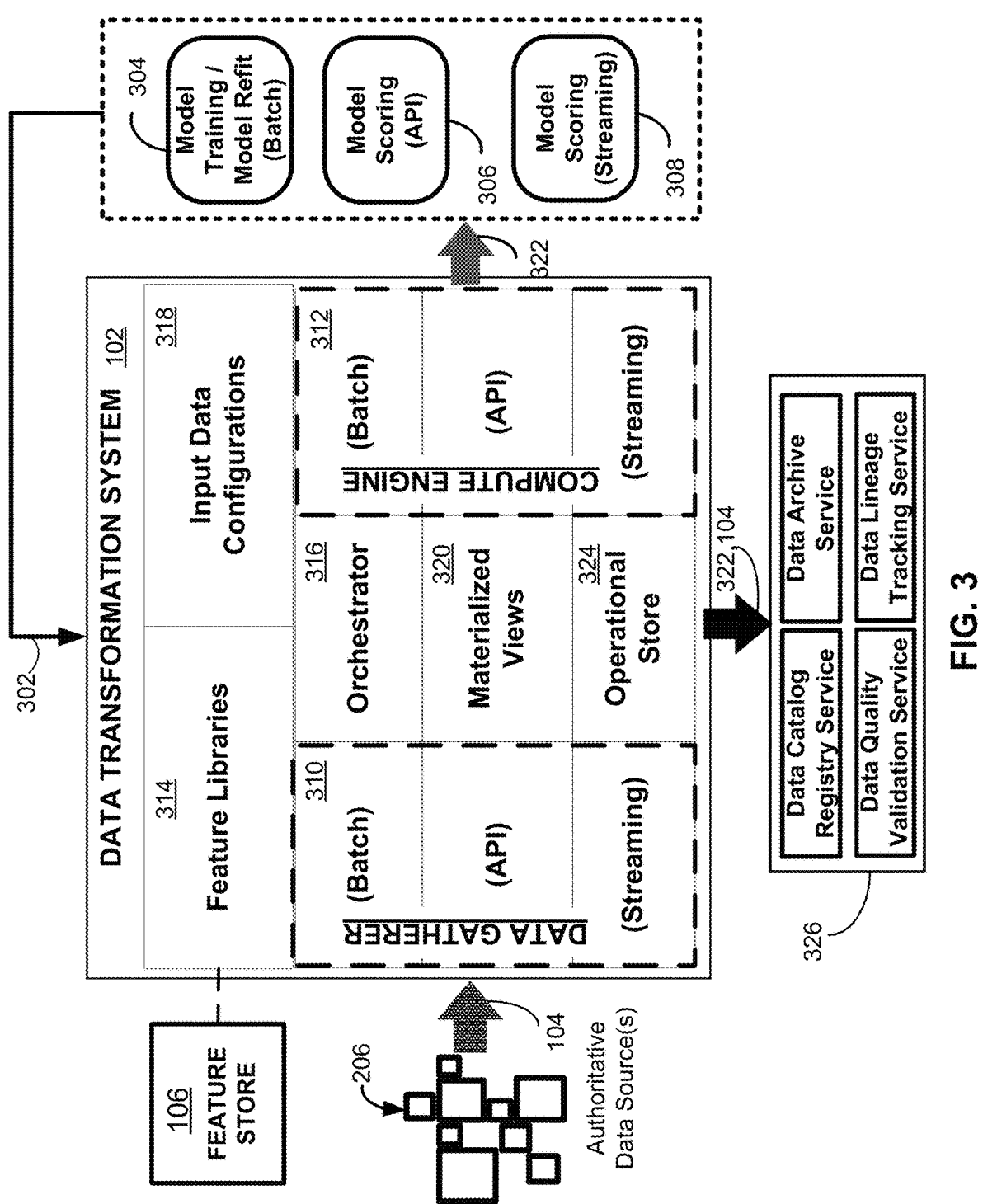
FIG. 3 depicts a data transformation system with associated modules, consistent with certain exemplary implementations of the disclosed technology.

FIG. 3 is a detailed illustration of the data transformation system 102 (as referenced above with respect to FIG. 1 and FIG. 2), according to an exemplary implementation of the disclosed technology. Certain implementations of the data transformation system 102 may utilize modularized logic to enable flexible mixing of execution context(s) for chained processing. In certain implementations, the modularized transformation logic may be reusable within the system 212.

The data transformation system 102 may receive a model scoring and/or model training request 302. The request 302 may instruct the system 212 to feed data to a machine learning model. Accordingly, a request 302 may directly or indirectly reference one or more features in the feature libraries 314 and/or the feature store 106.

In one exemplary implementation of the disclosed technology, the request 302 may instruct the system 212 to feed transformed batch data into a model for model training or model refit 304. In another exemplary implementation, the request 302 may instruct the system 212 to feed transformed real-time data to a model for model scoring 306, for example, via an API. In another exemplary implementation, the request 302 may instruct the system 212 to feed transformed streaming data to the model, for model scoring 308. In certain exemplary implementations of the disclosed technology, each type of request 302 (batch, API, streaming) may be connected to (or work in conjunction with) corresponding modules of the data gatherer 310 (batch, API, steaming) and/or the compute engine 312 (batch, API, steaming).

The data transformation system 102 can include one or more feature libraries 314 that may comprise reusable collections of transformation logic. In certain exemplary implementations, the feature libraries 314 may be derived from, may receive features from, and/or may be embodied as a feature store 106, as discussed above with respect to FIG. 1. Each feature of the feature libraries 314, for example, can be a unit of transformation logic. As discussed above, the feature may include co-located and/or associated metadata. In certain exemplary implementations, each feature may be associated with one or more data quality validation tests. During runtime, for example, the data transformation system 102 may extract transformation logic from each feature referenced from the feature libraries 314 and may execute the defined transformation logic of the feature.

In certain exemplary implementations of the disclosed technology, once the request 302 has been received, an orchestrator 316 may manage the process of retrieving input data 104 from one or more authoritative data sources 206 for use with the referenced features from the feature libraries 314, for example, as referenced in the request 302. The orchestrator 316 may coordinate the operations of the data transformation system 102, which can include operations such as batch job scheduling, infrastructure management, data purging, backups, and/or other housekeeping chores. In certain exemplary implementations, input data configurations 318 may provide the specific data location information of the input data 104 for proper retrieval from the one or more authoritative data sources 206 to ensure that the proper requested data is accessed. In certain exemplary implementations, the orchestrator 316 may retrieve the correct transformation logic associated with each feature in the feature libraries 314. In certain exemplary implementations, the orchestrator 316 may save the transformation logic for later use, for example, in the feature store 106 or in the feature libraries 314.

In certain exemplary implementations of the disclosed technology, once the data needs are specified, for example, via the input data configurations 318, the specific data gatherer 310 (batch, API, or streaming) may be called to retrieve the specified input data 104 from the one or more authoritative data sources 206. The data gatherer 310, for example, may communicate with the one or more authoritative data sources 206 in the process of selecting and ingesting the referenced input data 104. In certain exemplary implementations, the data returned from the data gatherer 310 may be placed into materialized views 320 according to the entity mapping configurations, and the materialized views 320 may act as temporary storage for this data.

In certain exemplary implementations, once the data returned from the data gatherer 310 is placed into materialized views 320, the data transformation system 102 may pass the transformation logic extracted from the feature libraries 314 to the compute engine 312. Accordingly, the compute engine 312 may connect the transformation logic to the materialized views 320.

As discussed above, the feature transformation logic may be defined as a pure function. For example, a function: f(a, b)=c, may be defined to be "a+b", which returns the output "c." As an example, the compute engine 312 may retrieve a and b from the materialized views 320, pass a and b to the pure function f(a, b), which will add a and b and return c. In certain implementations, the output data 322 (result c) may be saved for later use. At this point, the output data 322 can be returned directly to the model, e.g. for model training 304, API scoring 306, and/or model scoring 308 depending on the context. In certain implementations, the output data 322 may also be saved in an operational store 324 for serving subsequent requests 302. In certain exemplary implementations, the operational store 324 may serve the pre-computed output of the transformations. The operational store 324 may provide internal caching needs. The operational store 324 may take on multiple forms, including message bus, file serving service, and/or API.

It should be emphasized again that the compute engine 312 may be configured to implement a given set of transformation logic as decoupled functions tailored to specific needs. A first transformation process that utilizes batch data, for example, can be preferred because the upstream data input producer or source 206 provides the input data 104 in a nightly batch fashion. On the other hand, a second transformation process may rely on the output result of the first transformation process, but the second transformation process may run in a streaming fashion because it gets triggered or initiated upon other data input that arrives via an event-driven mechanism. In this example implementation, the compute engine 312 is configured for chaining the modularized transformation within a single execution context, and the compute engine is also configured for mixing execution contexts (batch and streaming). In certain exemplary implementations of the disclosed technology, the transformation logic functions may be modularized, and the chaining may be managed by passing the output of the dependent transformations. In this respect, the compute engine 312 may chain a module written in one language (e.g. Python) with another (e.g. Scala).

In certain exemplary implementations, the compute engine 312 may work with the materialized views 320. For example, the compute engine 312 may store a copy of the entity mapping configurations and a copy of the transformation logic defined by the feature libraries 314. In certain exemplary implementations, the compute engine 312 may serialize the entity mapping configuration to the transformation logic function's input parameter variables via dependency injection during runtime. Accordingly, this mechanism may enable the transformation logic functions to operate without requiring knowledge of the underlying tech stack of the materialized views 320 or the originating data sources 206. In certain exemplary implementations of the disclosed technology, such abstraction may enable the associated functions to be data source agnostic, and thus continue to operate effectively even when there are changes in the data source technology. Thus, as the data structure of the originating data source 206 changes, the entity mapping configurations may be adjusted accordingly without affecting the transformation logic, which may serve to maintain consistency.

As discussed above, the transformation logic defined in the feature libraries 312 may be abstracted away from the compute engine 312 as one or more simple functions such that the transformation logic and the compute engine 312 are independent. In this respect, the functions can be written in a few supported widely used languages in the industry. The compute engine 312 may be embodied in different forms, for example, to handle batch jobs, web-based API processes, and/or a streaming framework. Also, the compute engine 312 is flexible in that it may be swappable with different tech stack choices, as needed. In certain exemplary implementations, the functions implemented by the transformation logic may be organized into collections/libraries. The feature libraries 312 can be packaged as artifacts that get deployed to the compute engine 312 which can load and run the artifacts according to the execution context.

In certain exemplary implementations, one or more data services 326 may be utilized to register, archive, validate, and/or track the output data 322. A Data Archive Service may be utilized as storage for the output data 322, for example, in a non-operational system of record. In an exemplary implementation, a Data Lineage Tracking Service may keep track of the operations run during the execution by the data transformation system 102 so that the processes may be audited. The Data Catalog Registry Service, for example, may connect input data configurations 318 to the actual input data 104 received from the authoritative data sources 206, related data stores, and/or feature store 106. In certain exemplary implementations, the Data Quality Validation Service may allow running data quality checks on input data 104 (fed into the transformations) and output data 322 (produced by the transformations), for example, to catch and remedy detected problems, inconsistencies, or errors.

Figure 4:
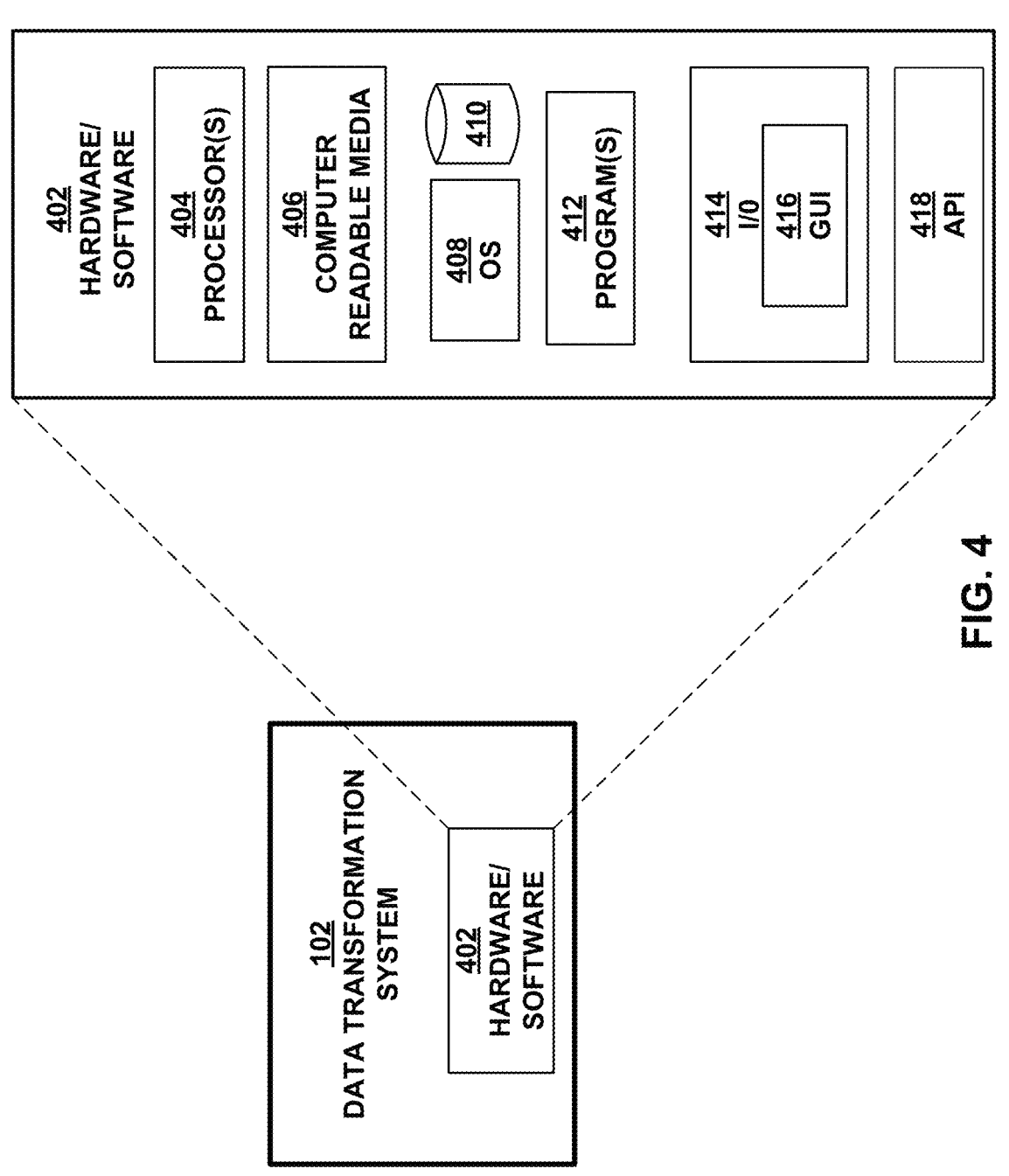
FIG. 4. illustrates hardware and software components that may be utilized by the data transformation system, per certain exemplary implementations of the disclosed technology.

FIG. 4 is a block diagram of the data transformation system 102, with an expanded block diagram showing example hardware and software 402 components according to an aspect of the disclosed technology. The hardware and software 402 can include one or more processors 404, a non-transitory computer-readable medium 406, an operating system 408, memory 410, one or more programs 412 including instructions that cause the one or more processors 404 to perform certain functions; an input/output ("I/O") device 414, and an application program interface (API) 418, among other possibilities. The I/O device 414 may include a graphical user interface 416.

In certain embodiments, that API interface 418 may utilize real-time APIs such as Representational State Transfer (REST) style architecture. In certain embodiments, a real-time API may include a set of Hypertext Transfer Protocol (HTTP) request messages and a definition of the structure of response messages. In certain aspects, the API may allow a software application, which is written against the API and installed on a client to exchange data with a server that implements the API in a request-response pattern. In certain embodiments, the request-response pattern defined by the API may be configured synchronously and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Alternatively, the client may send GET and POST requests with JSON serialized parameters in the body. Preferably, the requests with JSON serialized parameters use "application/json" content-type. In another aspect, an API design may also require the server to implement the API return messages in JSON format in response to the request calls from the client.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general-purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general-purpose machines as computer processing instructions, all or a portion of the functionality of the disclosed embodiments may be implemented instead in dedicated electronics hardware.

The disclosed embodiments also relate to tangible and non-transitory computer-readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

A peripheral interface may include the hardware, firmware, and/or software that enables communication with various peripheral devices, such as media drives (e.g., magnetic disk, solid-state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

A mobile network interface may provide access to a cellular network, the Internet, or another wide-area or local area network. In some embodiments, a mobile network interface may include hardware, firmware, and/or software that allows the processor(s) 404 to communicate with other devices via wired or wireless networks, whether local or wide area, private or public, as known in the art. A power source may be configured to provide an appropriate alternating current (AC) or direct current (DC) to power components.

The one or more processors 404 may include one or more of a microprocessor, microcontroller, digital signal processor, co-processor, or the like or combinations thereof capable of executing stored instructions and operating upon stored data. The memory 410 may include one or more suitable types of memory (e.g. such as volatile or non-volatile memory, random access memory (RAM), read-only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data within the memory 410.

The one or more processors 404 may be one or more known processing devices, such as but not limited to, a microprocessor from the Pentium™ family manufactured by Intel™ or the Turion™ family manufactured by AMD™. The one or more processors 410 may constitute a single core or multiple-core processor that executes parallel processes simultaneously. For example, a processor 410 may be a single-core processor that is configured with virtual processing technologies. In certain embodiments, the one or more processors 410 may use logical processors to simultaneously execute and control multiple processes. The one or more processors 410 may implement virtual machine technologies, or other similar known technologies to provide the ability to execute, control, run, manipulate, store, etc. multiple software processes, applications, programs, etc. One having ordinary skill in the art would understand that other types of processor arrangements could be implemented that provide for the capabilities disclosed herein.

In certain exemplary implementations of the disclosed technology, the memory 410 may include one or more memory devices that store data and instructions used to perform one or more features of the disclosed embodiments. The memory 410 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 410 may include software components that, when executed by the one or more processors 404, perform one or more processes consistent with the disclosed embodiments. In some embodiments, the memory 410 may include a database for storing related data to perform one or more of the processes and functionalities associated with the disclosed embodiments.

FIG. 5 is a flow diagram of a method 500, according to an exemplary implementation of the disclosed technology. In block 502, the method 500 includes receiving, by a data-gathering module, input data from a data source. In block 504, the method 500 includes transforming, according to a unit of transformation logic and by a compute engine, the input data to produce a derived data output. In block 506, the method 500 includes storing, in a derived data library, the derived data output. In block 508, the method 500 includes storing, in a data catalog, logic metadata corresponding to the execution of the transformation logic. In block 510, the method 500 includes one or more of training, scoring, and re-fitting a machine learning model using the derived data output.

In certain exemplary implementations, the batch historical data may be utilized to train or re-fit the machine learning model. In certain exemplary implementations, streaming data may be utilized to score the machine learning model. In certain exemplary implementations, the streaming data may be real-time streaming data.

In certain exemplary implementations of the disclosed technology, the data-gathering module can include one or more of a batch data-gatherer module, an application programming interface (API) data-gatherer module, and a streaming data-gatherer module.

In certain exemplary implementations, the compute engine can include one or more of a batch compute module, an API compute module, and streaming compute module.

In certain exemplary implementations of the disclosed technology, the compute engine may be configured to implement a selectable unit of transformation logic. In certain exemplary implementations, the input data may be transformed to produce the derived data output according to a selected unit of transformation logic.

Certain implementations may include detecting, by an orchestrator 315, a type of the input data 104 from the data source 206 and automatically selecting and triggering a corresponding type of transformation logic. In certain exemplary implementations, the type can include one of batch, API, or streaming transformation logic.

In accordance with certain exemplary implementations of the disclosed technology, one or more features may be pre-computed and stored for later retrieval and used to provide improvements in processing speeds.

As used in this application, the terms "component," "module," "system," "server," "processor," "memory," and the like are intended to include one or more computer-related units, such as but not limited to hardware, firmware, a combination of hardware and software, software, or software in execution. For example, a component may be but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. Also, these components can execute from various computer-readable media having various data structures stored thereon. The components may communicate by way of local and/or remote processes such as by a signal having one or more data packets, such as data from one component interacting with another component in a local system, distributed system, and/or across a network such as the Internet with other systems by way of the signal.

Certain embodiments and implementations of the disclosed technology are described above regarding block and flow diagrams of systems and methods and/or computer program products. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, can be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include but are not limited to portable computers, tablet PCs, internet tablets, PDAs, ultra-mobile PCs (UMPCs), wearable devices, and smartphones. Additionally, implementations of the disclosed technology can be utilized with the internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation,"

"example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in the article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

Certain exemplary use cases are discussed below regarding FIG. 6 and FIG. 7 for utilizing systems and methods disclosed herein. These use case examples are intended solely for explanatory purposes and are not intended to limit the disclosed technology.

Figure 6:
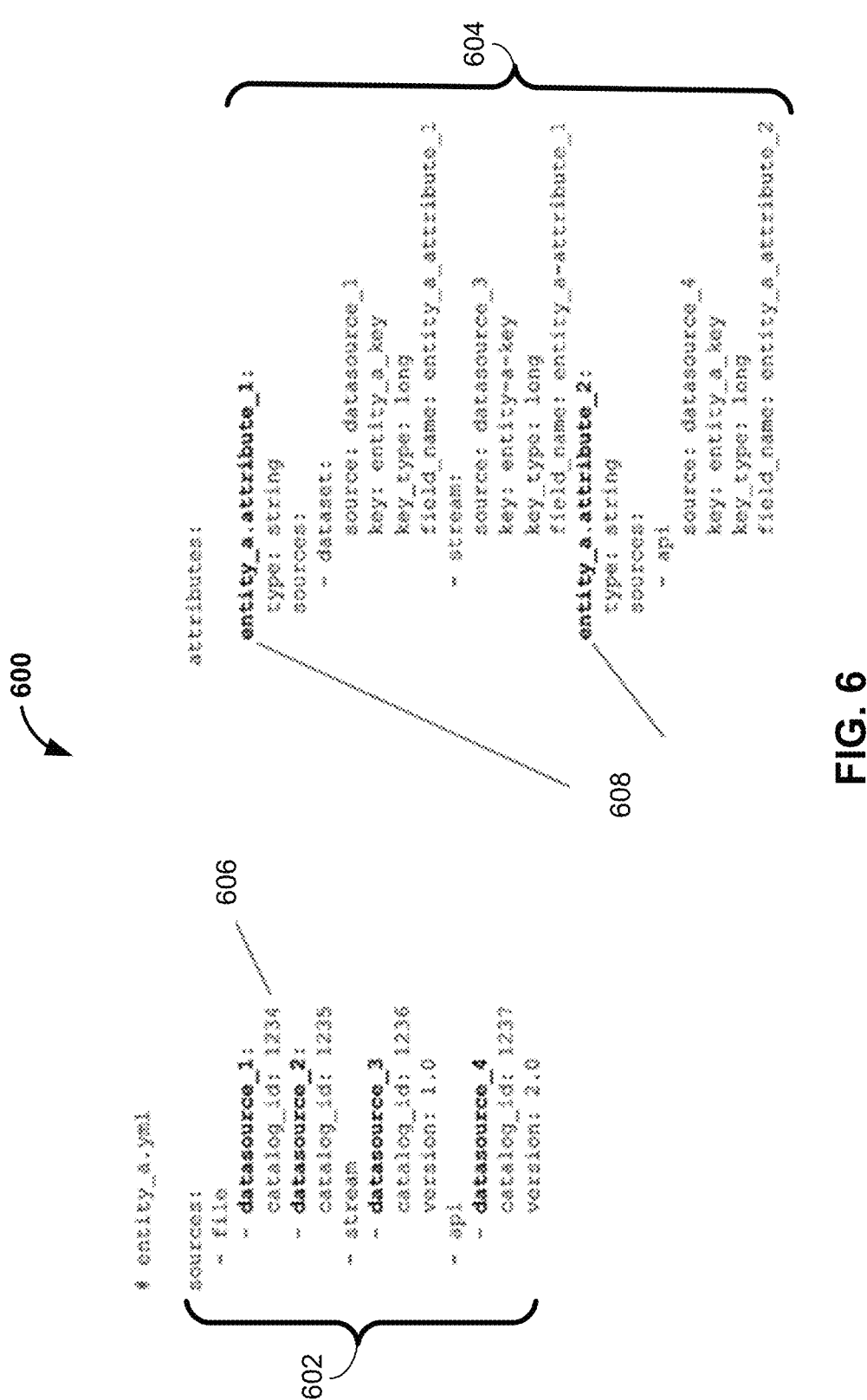
FIG. 6 illustrates a use case with source and attribute listings 600 for data transformation, according to an exemplary embodiment of the disclosed technology.

FIG. 6 illustrates a first use case with source and attribute listings 600 for data transformation, according to an exemplary embodiment of the disclosed technology. In this example, YAML code is utilized to specify data sources 602 and associated attributes 604. The data sources 602, for example, may include batch file, streaming, and API. A batch file data source can be identified by a catalog_id 606, which may be used to look up the location, schema, and other metadata that may be referenced to access the associated data from a data catalog registry service. As depicted, the attributes 604 may define additional metadata 608. For example, sometimes the attributes may not match across different data serving contexts (batch, API, streaming), thus transformation functions in different execution contexts may be referenced to account for such differences.

To further illustrate a specific use case for application of the disclosed technology, a financial institution may want to determine whether or not a current customer should be given a credit line increase. To make this determination, a model may be created to predict whether or not a customer would continue to maintain a healthy relationship with that institution if given a credit line increase. The model could use inputs from a variety of sources, such as the customer's current payment history. The features may then be used to determine the number of times that the customer was late on payments, or if the customer had ever overdrawn their account. Each of these feature calculations could be written as a simple algorithm defining payment or balance data as input and generating an aggregated value as output, which could then be sent on to the predictive model. These calculations and models may be run within the data transformation system in batch, on a monthly cycle, to determine who should (not) receive a credit line increase.

Figure 7:
FIG. 7 illustrates a use case with transformation and associated metadata code 700, according to an exemplary embodiment of the disclosed technology.

FIG. 7 illustrates a second use case in which Python code 700 is utilized to define the transformation function code 702 and associated metadata 704, according to an exemplary embodiment of the disclosed technology. In this example, the referenced entity attributes 706 708 may be prepared with a logical data model by a data gatherer as specified by the metadata 704 to produce the transformation output 710. As specified by the metadata 704, the input dataset may have a pre-filter 712 applied for optimization. In certain exemplary implementations, the pre-filter 712 may be overridable as a parameter. In this example, the metadata 704 may specify keys 714, for example, to qualify the derived data value, for access later.

To further illustrate another specific use case for application of the disclosed technology, a financial institution may wish to detect fraud. For example, a model may be created to determine the probability that a given credit card transaction is fraudulent. This model could be fed by calculations based on transaction history, such as transaction amounts, transaction frequency, type of purchase, location data, etc. Each feature calculation could be written as a simple algorithm that may utilize defined transaction history data as input, and may generate an output as an aggregated value, which then could be used by the fraud prediction model to determine the probability that transaction is fraudulent. In this example, the calculations and the model may be handled by the data transformation system in real-time, for example, responsive to a swipe of a credit card. An "authorize" or "decline" indication may be sent to the merchant based on the processing by the model, and possibly dependent on the speed of the fraud detection process (since customers and merchants do not wish to wait). Such real-time fraud detection may pose different execution challenges compared with the credit line increase example discussed above. However, the calculation logic could be the same for both batch and real-time execution, thus leaving the performance concerns to be addressed by the underlying data transformation system. This example demonstrates the power of decoupling the transformation logic from underlying data stores and distributed computation technology.

The invention claimed is:

1. A system, comprising:

one or more processors in communication with:

a data gathering module;

a compute engine comprising at least one processor configured to execute transformation logic, wherein the transformation logic comprises a library of transformation logic units that are decoupled from functions involving retrieving data from one or more data sources and the compute engine is configured to be used in a plurality of execution contexts, the plurality of execution contexts comprising at least batch execution, application programming interface (API) processes and streaming execution;

a data catalog comprising memory configured to store logic metadata;

a derived data library; and memory storing instructions that, when executed by the one or more processors, are configured to cause the system to:

receive, by the data gathering module, input data from a data source;

transform, according to the transformation logic and by the compute engine, the input data to produce a derived data output;

store, in the derived data library, the derived data output;

co-locate, as text in transformation function code, human- and machine-readable programmable logic metadata corresponding to execution of the transformation logic, wherein the logic metadata comprises an overridable pre-filter as a parameter for an input dataset to qualify the derived data output; and one or more of train, score, and re-fit a machine learning model using the derived data output.

2. The system of claim 1, wherein batch historical data is utilized to train or re-fit the machine learning model.

3. The system of claim 1, wherein streaming data is utilized to score the machine learning model.

4. The system of claim 3, wherein the streaming data is real-time streaming data.

5. The system of claim 1, wherein the data gathering module comprises one or more of a batch data gatherer module, an application programming interface (API) data gatherer module, and a streaming data gatherer module.

6. The system of claim 1, wherein the compute engine is configured to implement a selectable unit of decoupled transformation logic, and wherein the input data is transformed to produce the derived data output according to a selected unit of decoupled transformation logic, wherein the decoupled transformation logic is a pure function and is independent of the data gathering module.

7. The system of claim 1, further comprising an orchestrator comprising memory in communication with the one or more processors, wherein the orchestrator is configured to detect a type of the input data from the data source and automatically select and trigger a corresponding type of reusable transformation logic, wherein the type comprises one of batch, API, or streaming.

8. The system of claim 1, wherein the data gathering module comprising memory is configured to receive raw input data from an authoritative data source.

9. The system of claim 1, wherein the logic metadata describes one or more of:

one or more derived data keys; and a derived data output type.

10. A method, comprising:

receiving, by a data gathering module, input data from a data source;

transforming, according to a unit of transformation logic and by a compute engine, the input data to produce a derived data output wherein the unit of transformation logic is decoupled from functions involving retrieving data from one or more data sources and the transformation logic is configured to be used in a plurality of execution contexts, the plurality of execution contexts comprising at least batch execution, application programming interface (API) processes and streaming execution;

storing, in a derived data library, the derived data output;

storing, in a data catalog, logic metadata corresponding to execution of the transformation logic; and one or more of training, scoring, and re-fitting a machine learning model using the derived data output.

11. The method of claim 10, wherein batch historical data is utilized to train or re-fit the machine learning model, and wherein streaming data is utilized to score the machine learning model.

12. The method of claim 11, wherein the streaming data is real-time streaming data.

13. The method of claim 10, wherein the data gathering module comprises one or more of a batch data gatherer module, an application programming interface (API) data gatherer module, and a streaming data gatherer module.

14. The method of claim 10, wherein the logic metadata is configured to enable a nesting of one or more features to reduce duplication.

15. A non-transitory computer-readable storage medium storing instructions that are configured to cause one or more processors to perform a method of:

receiving, by a data-gathering module, input data from a data source;

transforming, according to a unit of transformation logic and by a compute engine, the input data to produce a derived data output wherein the unit of transformation logic is configured to not retrieve the input data from the data source but is configured to reference the input data received by the data-gathering module and the compute engine is configured to be used in a plurality of execution contexts, the plurality of execution contexts comprising at least batch execution, application programming interface (API) processes and streaming execution;

storing, in a derived data library, the derived data output;

co-locating and storing as text in transformation function code, human- and machine-readable programmable logic metadata corresponding to the transformation logic, wherein the logic metadata comprises an overridable pre-filter as a parameter for an input dataset to qualify the derived data output; and one or more of training, scoring, and re-fitting a machine learning model using the derived data output, wherein batch historical data is utilized to train or re-fit the machine learning model, and wherein streaming data is utilized to score the machine learning model.

16. The system of claim 1, wherein the one or more data sources comprise one or more of an authoritative data source and a database.

17. The system of claim 1, wherein the metadata provides contextual information regarding one or more of dependencies, lineage, quality and discovery.

18. The method of claim 14, wherein one of the one or more features comprises instructions on how to transform input data into new output data.

19. The system of claim 1, wherein operation of the compute engine is not affected by changes in data sources, storage mediums, models, or data retrieval technology used by the data gathering module to retrieve data.

20. The system of claim 1, wherein the transformation logic is modularized and allows mixing of execution contexts for chained processing.

\* \* \* \* \*